June 16, 1931.   J. WAHL ET AL   1,810,115

AIR BAG VALVE COUPLING

Filed March 30, 1927

INVENTORS:
John Wahl and
Otto Melzer,
By Attorneys,

Patented June 16, 1931

1,810,115

UNITED STATES PATENT OFFICE

JOHN WAHL AND OTTO MELZER, OF QUEENS, NEW YORK, ASSIGNORS TO A. SCHRADER'S SON, INCORPORATED, OF BROOKLYN, NEW YORK, A CORPORATION OF NEW YORK

AIR BAG VALVE COUPLING

Application filed March 30, 1927. Serial No. 179,583.

This invention relates to couplings for air bag valves or the like, and aims to provide certain improvements therein.

In vulcanizing tire shoes or casings it has been customary to extend the casing against the wall of the mould by a so-called air bag which is inflated by air pressure prior to or during the vulcanizing operation. In certain instances hydraulic pressure has been used instead of air pressure. It is common practice to arrange a series of such moulds in a chamber and to press the entire series against the cover by the use of a hydraulic ram. Within the moulds is built up a series of so-called manifold couplings which connect with each other, one coupling being used for each mould through which the fluid for the air bags is introduced under pressure. Each of such manifold couplings is provided with a small pipe leading to the particular mould for which it is intended, and these pipes are detachably coupled to a valve which is connected to the air bag of such mould.

The object of the present invention is to provide a coupling for connection with such air bag valves which shall be easily manipulated, and will insure a tight connection between the parts. The invention is susceptible of other uses if desired. The various features of improvement will be hereinafter more fully described and pointed out in the claims.

Referring to the drawings which illustrate one form of the invention,

Figure 1:
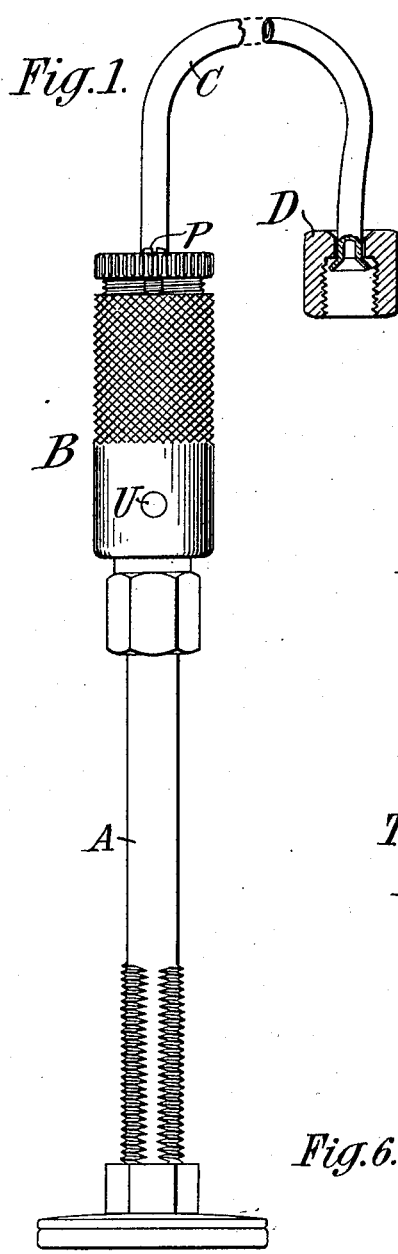
Figure 1 is an elevation of an air bag valve showing the improved coupling attached thereto.

Referring to the drawings let A indicate a form of air bag valve having at its bottom the usual flange by means of which it is connected to the air bag. B is the improved coupling as a whole which is connected by a pipe C to a union D adapted to be screwed on the manifold coupling (not shown).

Figure 3:
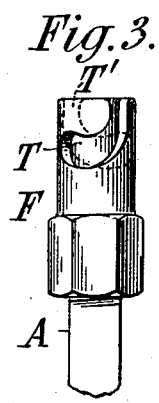
Fig. 3 is an elevation of the inner entering member of the coupling.
Figure 5:
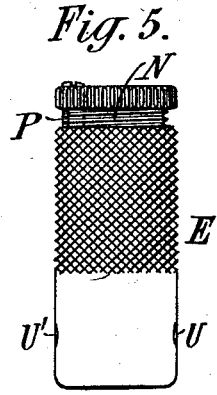
Fig. 5 is an elevation of the outer or receiving member of the coupling.
Figure 7:
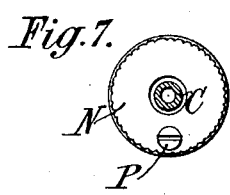
Fig. 7 is a section on the line 7—7 in Fig. 2.

In the preferred form of the invention illustrated the coupling comprises two parts, one of which is the outer member E shown detached in Fig. 5, and the other of which is the inner or entering member F shown in Fig. 3. Either of these parts may be connected to the valve and the other to the manifold coupling, but we prefer to connect the inner member to the valve as by means of a screw-threaded socket G which engages an interior thread on the valve. The upper end of the member F is formed with a seat H designed to engage a complemental seat member I carried by the part E.

The external or outer member E is best formed with a sleeve J which carries within it a seat member K which is mounted to reciprocate slightly within the sleeve J, being held within the sleeve by the shoulder L or the like. The seat member K is held under spring pressure in its lowermost position until forced backwardly slightly by the entering member, a spring M being utilized for this purpose which bears against the seat member at its bottom and against an adjustable plug N at its top. The plug N screws on an internal thread O in the sleeve J, and by adjusting the plug along this thread more or less tension can be placed upon the spring. A set screw P is best provided to hold the plug N in its adjusted positions.

Air is introduced into the coupling through the pipe C which in the construction shown passes through the adjusting plug N and is engaged with the seat member K, the latter having a passage through it which forms a continuation of the bore of the pipe C.

Means are provided for forming a tight connection between the pipe C and the seat member K which means are so constructed as to permit a ready interchange of pipes in case of necessity. The means adopted for this purpose comprise a nipple Q on the upper side of the seat member K which preferably has a tapered upper face, the nipple being screw-threaded to receive a sleeve R through which the end of the pipe passes and which has a complemental tapered face S. The end of the pipe being flared outwardly as shown is clamped between the two parts with a leak-tight joint.

Figure 2:
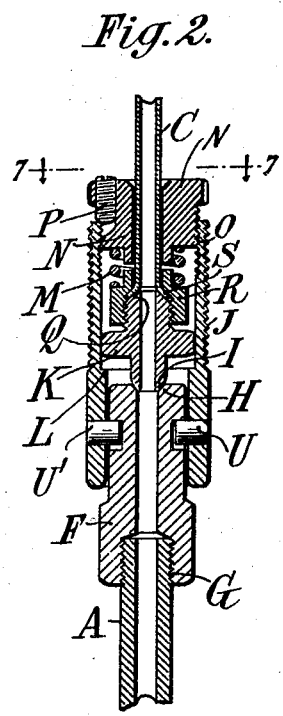
Fig. 2 is a diametrical section of a portion of Figure 1.
Figure 4:
Fig. 4 is a plan of Fig. 3.
Figure 6:
Fig. 6 is an elevation of some of the internal parts of the coupling detached.

To hold the two parts together we provide in the present construction a cam face upon the inner part, and cam pins or other mating surfaces extending inwardly from the outer part. Preferably the inner part is formed with two grooves T T' which constitute with the pins what is in effect a double bayonet joint. The pins may be inserted through the wall of the outer member as shown at U U' in Fig. 2, and expanded to hold them in place.

In joining the coupling the outer member is slipped down over the inner member, the pins entering the vertical portion of the slots, and then turned slightly so that the camming surfaces act to easily force the seat member K upwardly against the tension of its spring. At the end of the slots there is a slight rise in the latter so as to secure a lock effect without releasing the tension on the spring. The effect of this construction is that the joint is always made under a spring compression which is sufficient to insure a tight joint between the parts.

In operating a vulcanizing apparatus of the kind described, the heat conditions are very onerous upon the workmen who load and unload the apparatus, which operations must be quickly performed in order to utilize the vulcanizing apparatus to its fullest extent. The workman is required to make and break couplings many times during the day while standing over and reaching into the vulcanizing chamber. It is, hence, very desirable that the coupling act be accomplished as quickly as possible. At the same time the couplings must be capable of standing a very high pressure amounting to three or four hundred pounds or more without leakage. The device of the present invention is found to act admirably under the conditions, the coupling operation requiring but little effort on the part of the attendant and such effort being expended in a direction which is best adapted to the hand of the operator. The provision of the double bayonet joint not only secures the holding together of the parts symmetrically on opposite sides, but also provides two positions in which the coupling can be joined. If desired, a greater number of cam grooves can be used, and the number of positions of application increased. The coupling is, of course, susceptible to use in other connections than that described.

While we have shown and described one form of the invention it will be understood that we do not wish to be limited thereto, since various changes may be made therein without departing from the spirit of the invention.

What we claim is:

1. A coupling of the character described, comprising an inner member and an outer member each having a passage therethrough, the outer member having a spring-controlled seating member and means for adjusting the tension of the spring, the inner member having a seating face coacting with the spring-controlled seating member and providing, when in seating relation therewith, a substantially uniform and continuous passage through the coupling, the inner member having a plurality of cam grooves leading from the top thereof downwardly and circumferentially, and the outer member having projections entering said grooves.

2. A coupling of the character described comprising a cylindrical member, a spring-mounted seating member in said cylindrical member, said seating member having a screw-threaded nipple, a screw-threaded sleeve engaging said nipple and adapted to clamp the end of a pipe against the same, a spring engaging said sleeve, and a screw-threaded plug for adjusting the tension of said spring.

3. A coupling of the character described comprising a cylindrical member, a spring-mounted seating member in said cylindrical member, said seating member having a screw-threaded nipple, a screw-threaded sleeve engaging said nipple and adapted to clamp the end of a pipe against the same, a spring engaging said sleeve, and a screw-threaded plug for adjusting the tension of said spring in combination with an inner member having a seating face adapted to engage the said seating member, said inner member having superficial cam grooves in its sides, said grooves leading from the top of said inner member downwardly and circumferentially.

4. A coupling of the character described, comprising an entered member and an entering member each having a passage therethrough, the entered member having a spring-controlled, substantially non-deformable seating face, and the entering member having a substantially, non-deformable seating face coacting with the spring-controlled seating face and providing, when in seating relation therewith, a substantially uniform and continuous passage through the coupling, one of said members having a plurality of cam grooves leading from an edge thereof axially inwardly and circumferentially, and the other member having projections entering said grooves.

5. A coupling of the character described, comprising an entered member and an entering member, a spring-mounted seating member in one of the aforementioned members, a pipe in the same member as the seating member, said pipe having a tapered end and said seating member having a tapered surface for cooperative engagement with the end of the pipe.

6. A coupling of the character described, comprising an entered member and an entering member, a spring-mounted seating member in one of the aforementioned members, a pipe in the same member as the seating member, said pipe having a tapered end and said seating member comprising a pair of elements with tapered faces, both faces of which the end of the pipe is adapted to engage.

In witness whereof, we have hereunto signed our names.

JOHN WAHL.
OTTO MELZER.